No. 861,760. PATENTED JULY 30, 1907.
J. F. O'CONNOR.
ROLLER SIDE BEARING FOR RAILWAY CARS.
APPLICATION FILED MAR. 25, 1907.

2 SHEETS—SHEET 1.

Witnesses:
Wm. Geiger

Inventor:
John F. O'Connor
By Munday, Evarts, Adcock & Clarke
Attorneys

No. 861,760. PATENTED JULY 30, 1907.
J. F. O'CONNOR.
ROLLER SIDE BEARING FOR RAILWAY CARS.
APPLICATION FILED MAR. 25, 1907.

2 SHEETS—SHEET 2.

Witnesses:
Wm. Geiger

Inventor:
John F. O'Connor
By Munday, Evarts, Adcock & Clarke
Attorneys

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

ROLLER SIDE BEARING FOR RAILWAY-CARS.

No. 861,760.  Specification of Letters Patent.  Patented July 30, 1907.

Application filed March 25, 1907. Serial No. 364,329.

*To all whom it may concern:*

Be it known that I, JOHN F. O'CONNOR, a citizen of the United States, residing in Chicago, in the county of Cook and State of Illinois, have invented a new and useful Improvement in Roller Side Bearings for Railway-Cars, of which the following is a specification.

My invention relates to roller side bearings for railway cars.

The object of my invention is to provide a roller side bearing of a simple, strong, efficient and durable construction in which the rollers interposed between the upper and lower bearing plates will be automatically kept in central or proper relative position in respect to the upper and lower bearing plates, and in which the rollers and the upper bearing plate will automatically return to their normal or central position when the car, after passing around a curve, again passes onto a straight track and the load on the upper bearing plate is relieved.

My invention consists in the means I employ to practically accomplish this object or result as herein shown and described, the same comprising certain novel constructions of parts and devices and novel combinations of parts and devices as specified in the claims.

Figure 1:
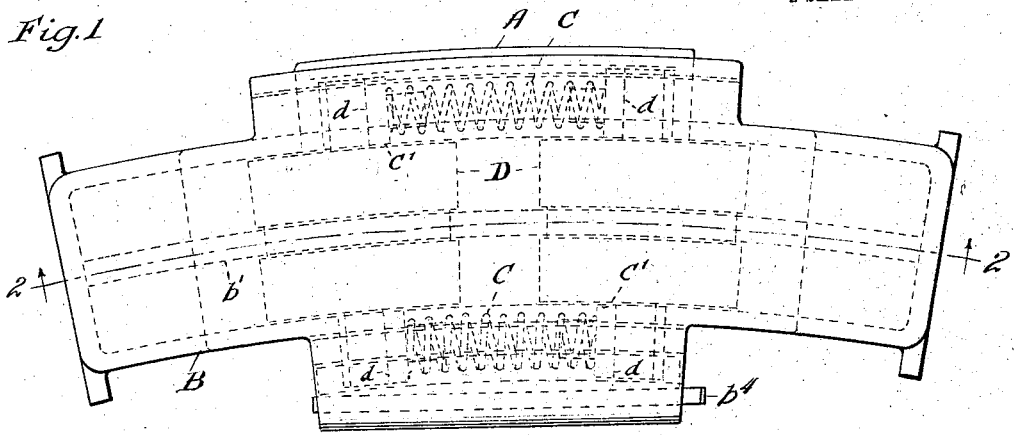
Figure 2:
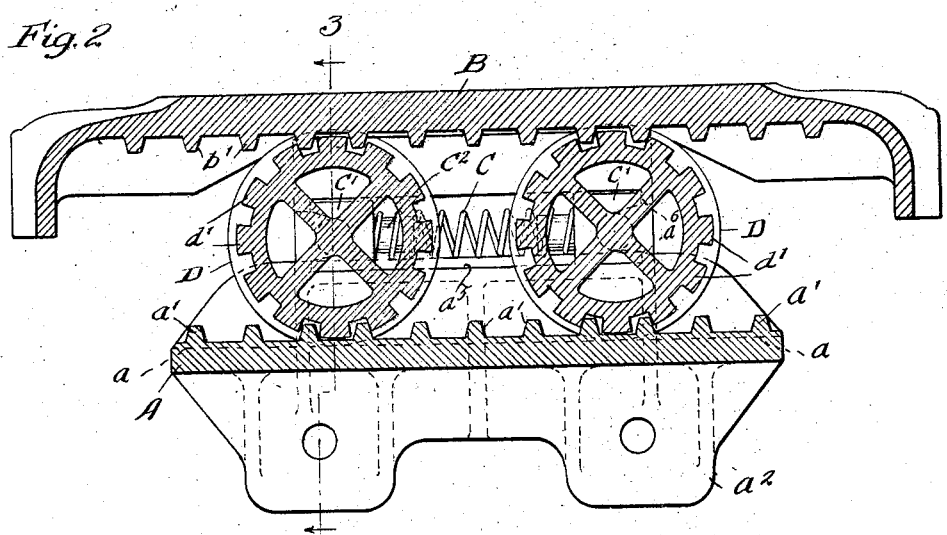
Figure 3:
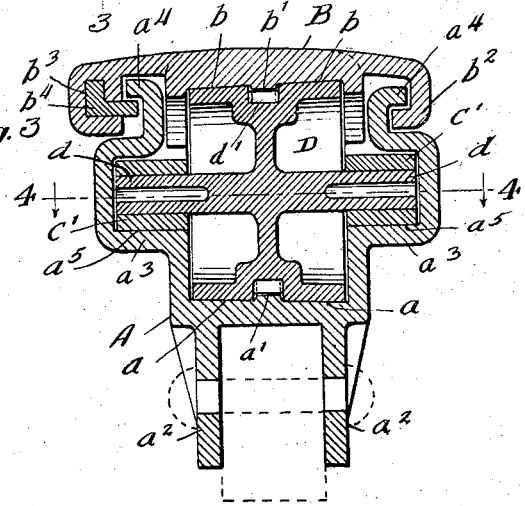
Figure 4:
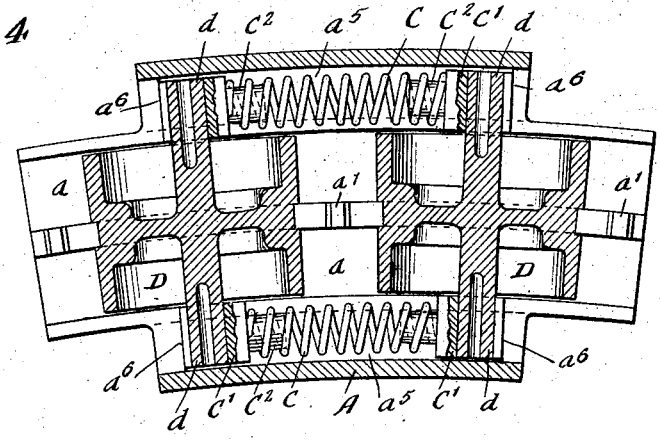
Figure 5:
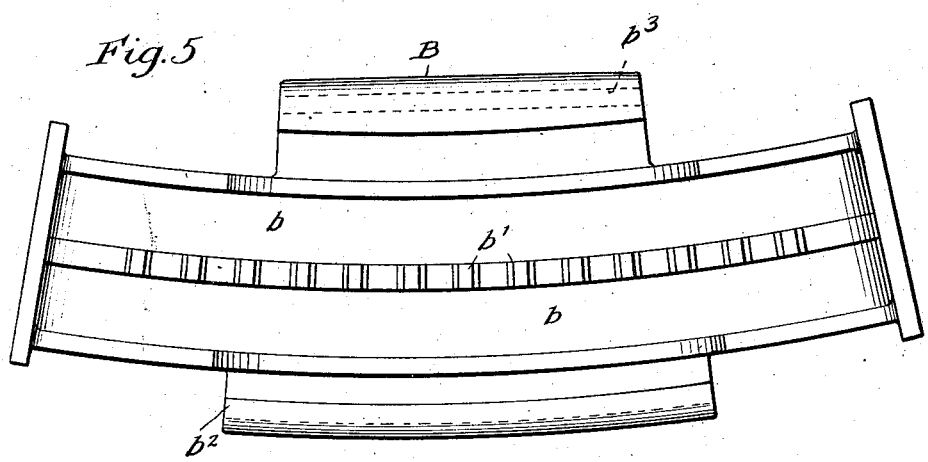
Figure 6:
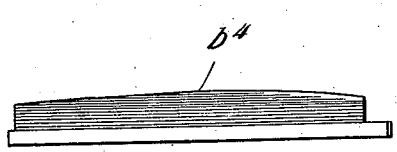
Figure 7:
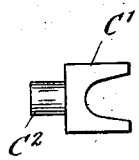

In the accompanying drawing forming a part of this specification, Figure 1 is a plan view of a roller side bearing embodying my invention. Fig. 2 is a central vertical longitudinal section on line 2—2 of Fig. 1. Fig. 3 is a vertical cross section on line 3—3 of Fig. 2. Fig. 4 is a horizontal section on line 4—4 of Fig. 3. Fig. 5 is a detail bottom view of the upper bearing plate; and Figs. 6 and 7 are detail views of parts to be described.

In the drawing, A represents the base or lower bearing plate, the same being secured to or carried by the truck, and B is the movable or traveling upper bearing plate against which the body bolster contacts or bears. The base or lower bearing plate A is provided with a roller tread or face $a$, curved about the king bolt as a center, and with a central toothed rack $a^1$ likewise curved about the king bolt as a center. The base or lower bearing plate A is provided with depending sides or flanges $a^2$ for securing the same to the truck frame piece, and also with upwardly projecting integral wings $a^3$ furnished with longitudinal guide flanges $a^4$ and longitudinally extending guide ways $a^5$ to receive the reduced ends or trunnions $d$ of the rollers D, and the bearing blocks or followers $C^1$ against which the springs C act, and with stops or shoulders $a^6$ for the bearing blocks or followers $C^1$ to abut against.

The upper or movable bearing plate B is furnished with a tread or track $b$ for the rollers D and a toothed rack $b^1$ to engage the gear teeth $d^1$ on the rollers D. And it is provided at one side with a guide flange $b^2$ which interfits and coöperates with one of the guide flanges $a^4$ on the base or lower bearing plate A. And at its other side, it is provided with a groove $b^3$ to receive a removable guide $b^4$ (see Fig. 6), preferably of angular form in cross section, which interfits with and engages the corresponding guide $a^4$ on the other side of the base or lower bearing plate A. One of the interfitting guides $a^4$, $b^2$, $a^4$, $b^4$, namely, the guide $b^4$ is made removable so that the bearing plates A and B may be conveniently and properly assembled and taken apart when required. The springs C C, one on each side of the side bearing, serve to automatically restore the antifriction rollers D and upper or movable bearing plate B to normal position, the gear teeth on the rollers and the toothed racks on the upper and lower bearing plates serving to keep the rollers in proper relative position in respect to each other and to the bearing plates. The bearing blocks or followers $C^1$ (see Fig. 7) against which the springs act are preferably of U shape and fit astride the studs or trunnions $d$ of the rollers D. Each of the bearing blocks or followers $C^1$ is preferably furnished with an integral stud $C^2$ which fits within the end of the coiled spring C and serves to guide the spring and hold it in place.

In operation, when the upper bearing plate B reciprocates or moves to the left, the right hand roller D by engagement of its studs or trunnions $d$ with the bearing blocks or followers $C^1$ compresses the springs; and when the car again returns to a straight track and the weight on the upper bearing plate B is relieved, the previously compressed springs return the upper bearing plate and the rollers to their normal position. And when the upper bearing plate moves to the right, the operation is the same but reversed. It will be understood that when the upper bearing plate and the rollers move to the left, the left hand bearing block or follower $C^1$ is held stationary by its abutment against the stop end $a^6$ of its guide way on the lower bearing plate A, the trunnions of the left hand roller at this time passing out of engagement with the left hand bearing blocks $C^1$. And when the upper bearing plate and rollers move to the right, the right hand bearing blocks $C^1$ are in turn held stationary.

I claim:—

1. In a roller side bearing for railway cars, the combination with a base or lower bearing plate furnished with a roller tread and toothed rack, of an upper movable or traveling bearing plate furnished with a roller tread and toothed rack, a pair of anti-friction rollers between said plates furnished with gear teeth meshing with said racks and furnished with trunnions, bearing blocks or followers engaged by the roller trunnions, springs between said bearing blocks or followers, the lower bearing plate having guides and stops for said bearing blocks or followers, substantially as specified.

2. In a roller side bearing, the combination with the base or lower bearing plate A, having a roller tread and rack, and provided with guides and stop shoulders for bearing blocks or followers, of an upper movable bearing plate having a roller tread and rack, toothed rollers interposed between said bearing plates and furnished with trunnions, bearing blocks or followers engaged by said trunnions and springs between said bearing blocks or followers, substantially as specified.

3. In a roller side bearing, the combination with upper and lower bearing plates, of a pair of rollers between said bearing plates furnished with trunnions, the lower bearing plate having guides and stops for followers, two pairs of followers between and engaging said trunnions and two springs between the followers, substantially as specified.

4. In a roller side bearing, the combination with upper and lower bearing plates, of a pair of rollers between said bearing plates, there being follower guides and stops on the lower bearing plate, followers between and acting against the rollers and springs between the followers, substantially as specified.

5. In a roller side bearing, the combination with upper and lower bearing plates, of a pair of rollers between said bearing plates, there being follower guides and stops on the lower bearing plate, followers between and acting against the rollers and springs between the followers, said bearing plates having interfitting guides, substantially as specified.

6. In a roller side bearing, the combination with upper and lower bearing plates, of a pair of rollers between said bearing plates, there being follower guides and stops on the lower bearing plate, followers between and acting against the rollers and springs between the followers, said bearing plates having interfitting guides, one of the guides on one of the plates being removable, substantially as specified.

7. In a roller side bearing for railway cars, the combination with a base or lower bearing plate furnished with a roller tread and toothed rack, of an upper movable or traveling bearing plate furnished with a roller tread and toothed rack, a pair of anti-friction rollers between said plates furnished with gear teeth meshing with said racks and furnished with trunnions, bearing blocks or followers engaged by the roller trunnions, springs between said bearing plates or followers, the lower bearing plate having guides and stops for said bearing blocks or followers, and interfitting guides on said upper and lower bearing plates, substantially as specified.

8. In a roller side bearing for railway cars, the combination with a base or lower bearing plate furnished with a roller tread and toothed rack, of an upper movable or traveling bearing plate furnished with a roller tread and toothed rack, a pair of anti-friction rollers between said plates furnished with gear teeth meshing with said racks and furnished with trunnions, bearing blocks or followers engaged by the roller trunnions, springs between said bearing plates or followers, the lower bearing plate having guides and stops for said bearing blocks or followers, and interfitting guides on said upper and lower bearing plates, one of the guides on one of the bearing plates being removable, substantially as specified.

JOHN F. O'CONNOR.

Witnesses:
EDMUND ADCOCK,
H. M. MUNDAY.